United States Patent [19]

Beckman et al.

[11] Patent Number: 5,277,648

[45] Date of Patent: Jan. 11, 1994

[54] LARGE ENCASED MEAT PRODUCT WITH FLAT ENDS

[75] Inventors: John H. Beckman, 135 Whitefawn Trail, Downers Grove, Ill. 60516; George C. Haettinger, LaGrange; Leonard I. Tafel, Mt. Prospect; Stuart P. Gavin, Downers Grove, all of Ill.

[73] Assignee: John H. Beckman, Downers Grove, Ill.

[21] Appl. No.: 1,287

[22] Filed: Jan. 7, 1993

Related U.S. Application Data

[63] Continuation-in-part of Ser. No. 982,027, Nov. 24, 1992, which is a continuation of Ser. No. 714,189, Jun. 12, 1991, abandoned.

[51] Int. Cl.$^5$ .................... A22C 13/00; A22C 11/00
[52] U.S. Cl. .......................... 452/39; 452/38; 452/21; 452/35
[58] Field of Search ............... 452/39, 38, 37, 30, 452/21, 32, 35

[56] References Cited

U.S. PATENT DOCUMENTS

| | | | |
|---|---|---|---|
| 4,007,761 | 2/1977 | Beckman | 452/38 |
| 4,064,673 | 12/1977 | Gerigk et al. | 452/21 |
| 4,132,047 | 1/1979 | Gerigk, et al. | 452/21 |
| 4,327,777 | 5/1982 | Michel et al. | 452/21 |
| 4,525,895 | 7/1985 | Raudys | 452/39 |
| 4,621,392 | 11/1986 | Raudys | 452/39 |
| 4,641,687 | 2/1987 | Kupukenicius | 452/39 |
| 5,003,666 | 4/1991 | Stall, et al. | 452/21 |
| 5,038,832 | 8/1991 | Mahoney, et al. | 452/38 |

*Primary Examiner*—Willis Little
*Attorney, Agent, or Firm*—McAndrews, Held & Malloy

[57] ABSTRACT

A joining system for flat end discs is used in an elongated encased food product. The food casing is joined to the flat end discs permitting food stuffing of the casing. An adhesive joining, a clamping joining, a tension band joining or a piercing joining takes place in an area external to and within the peripheral boundaries of the flat end discs. The axial outward force of the food product on the discs is thus coupled to the axial tension of the casing joined to the discs.

23 Claims, 10 Drawing Sheets

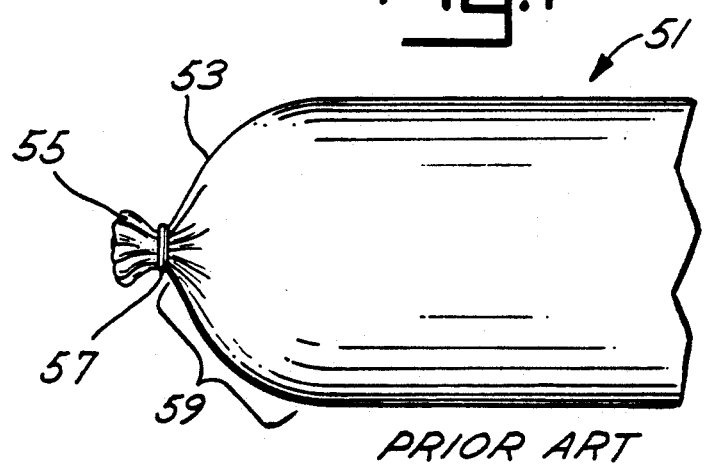
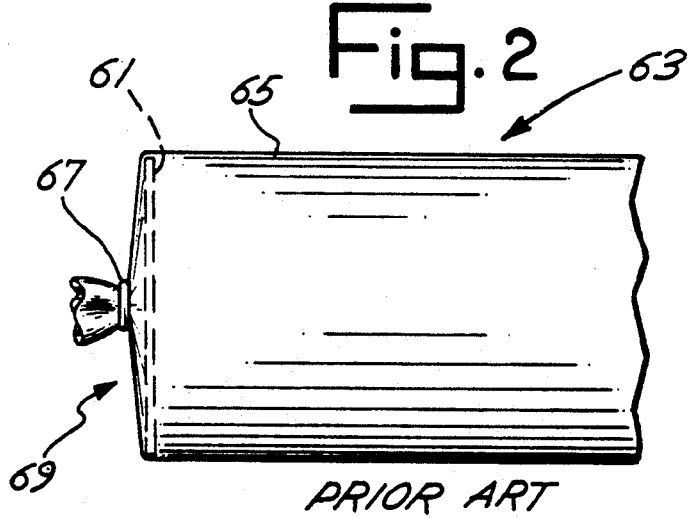
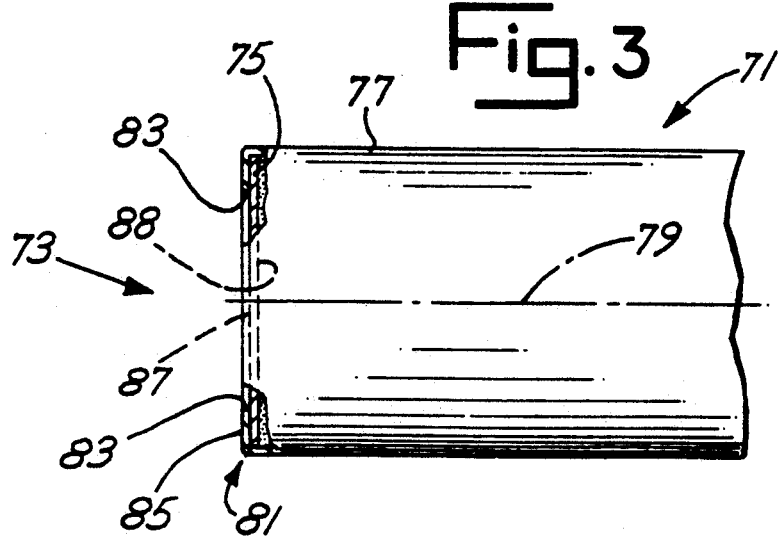

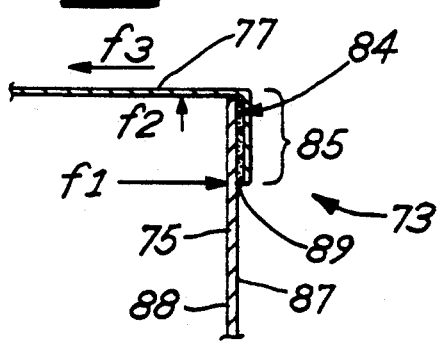
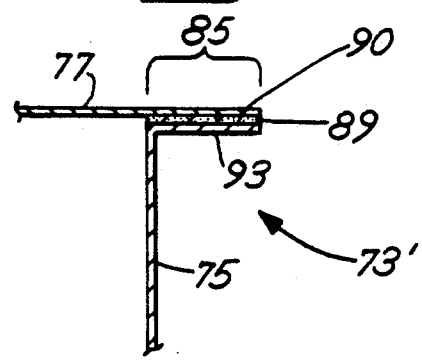
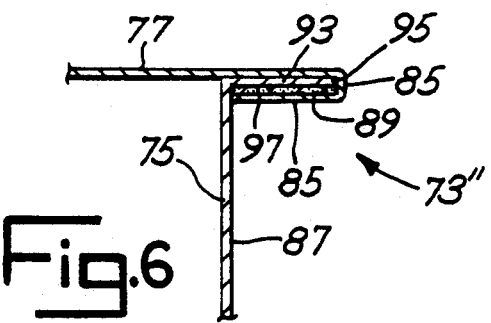
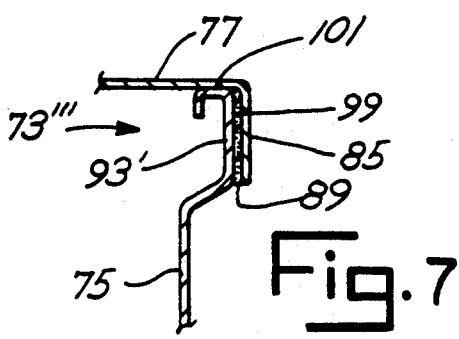
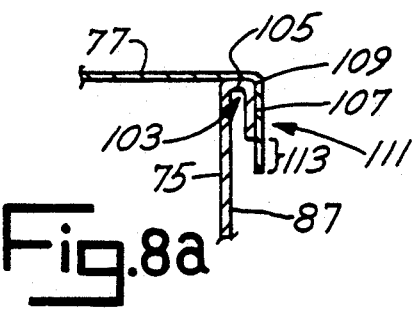
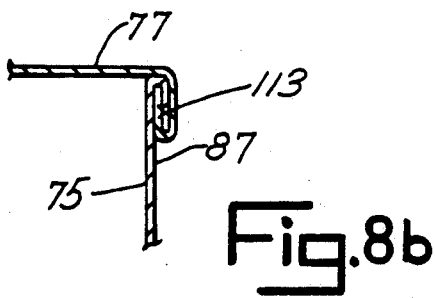
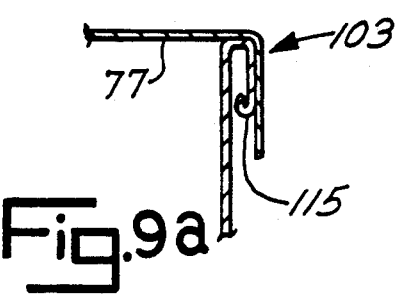
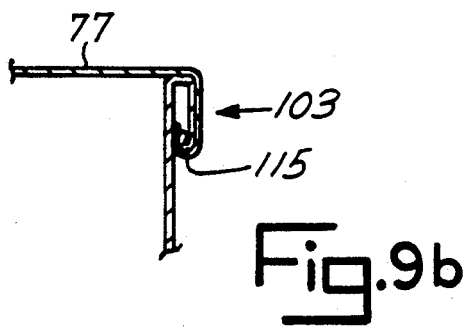

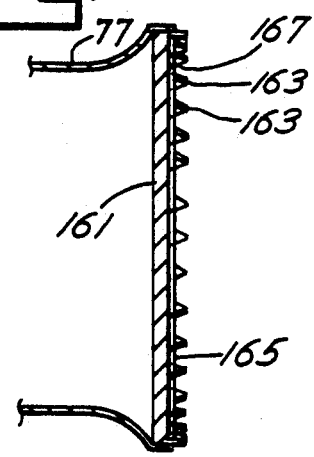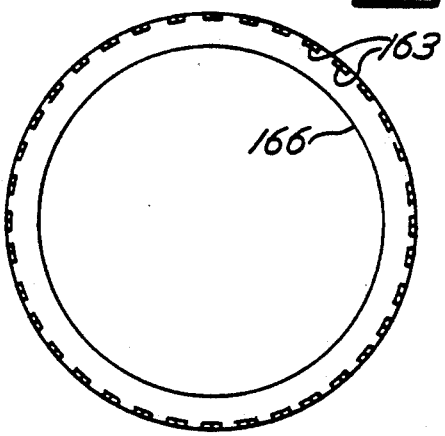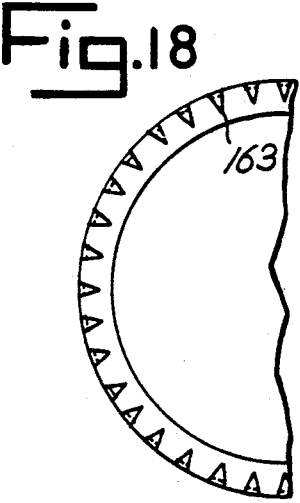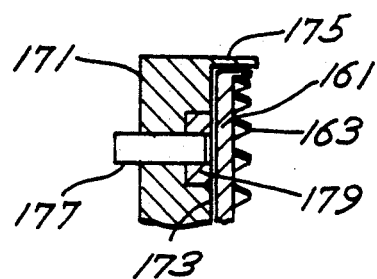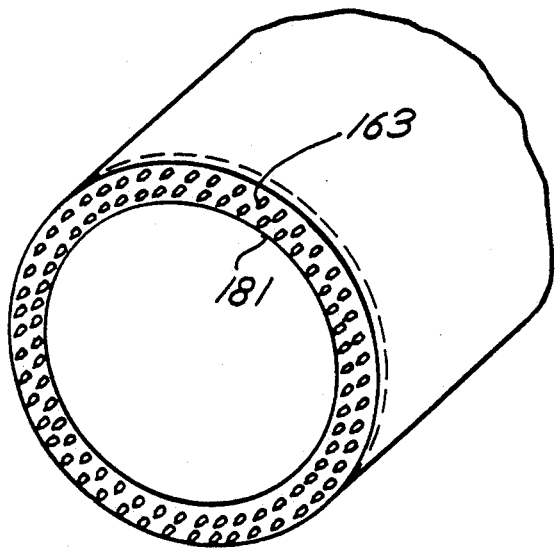

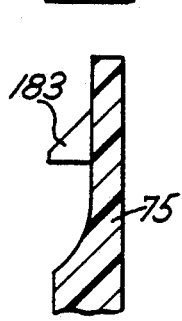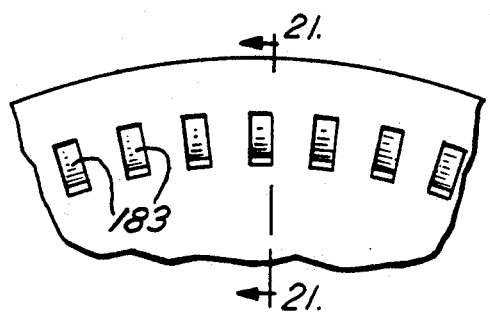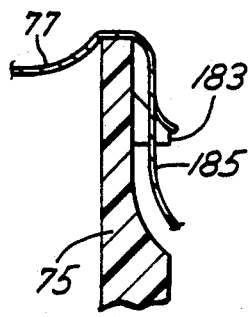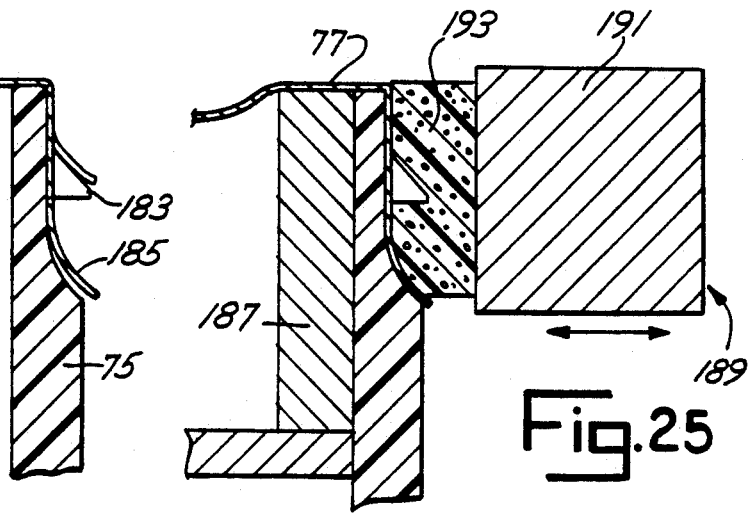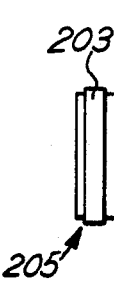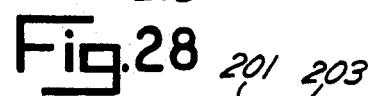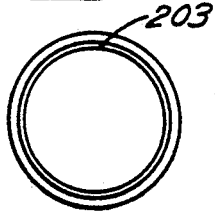

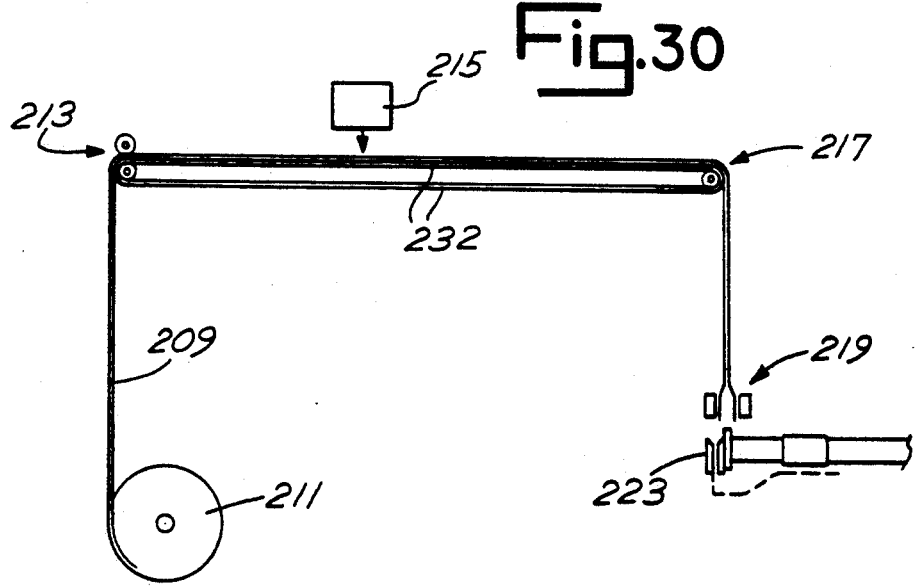
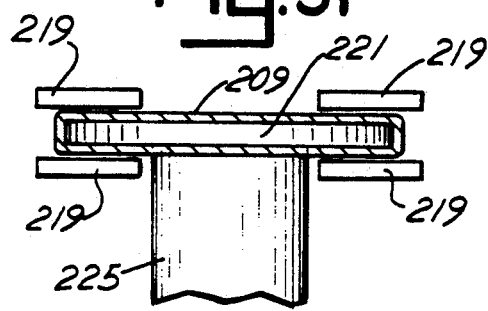
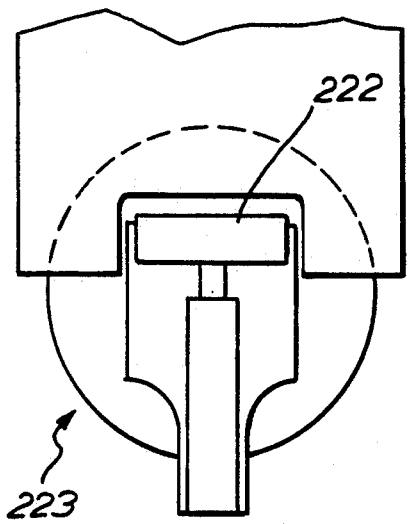
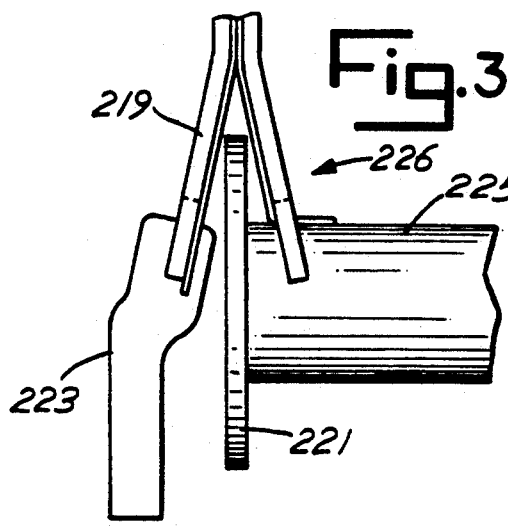

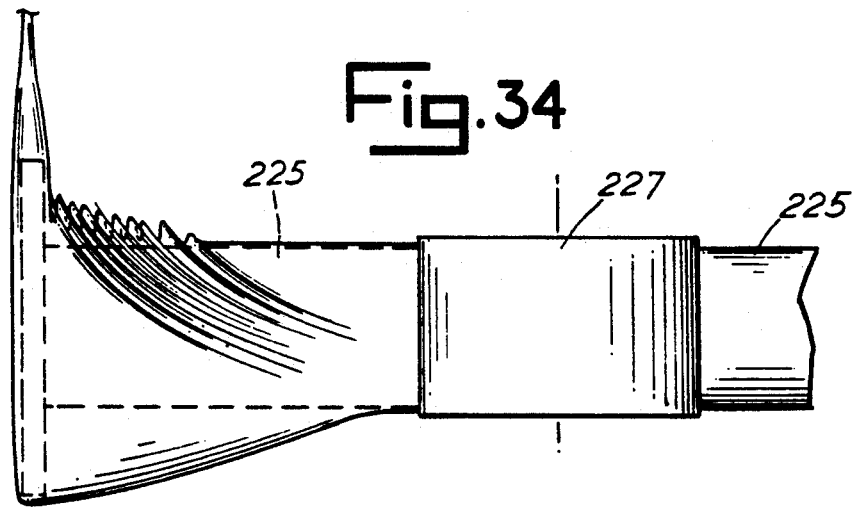
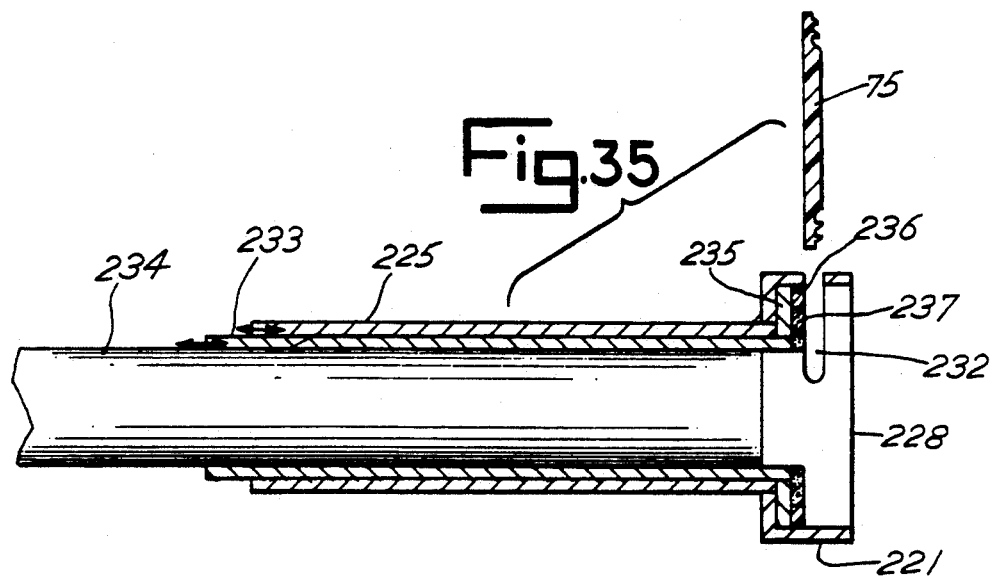
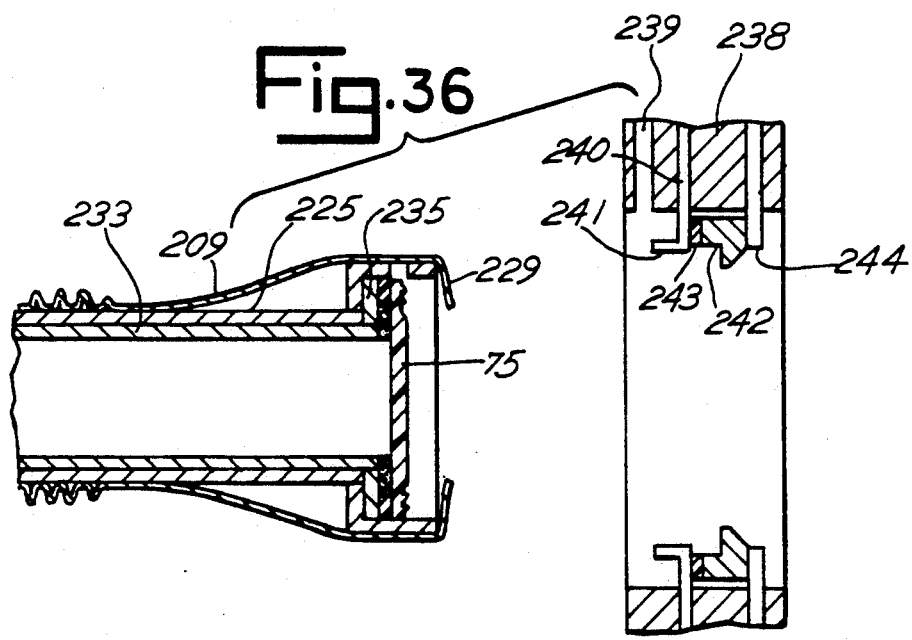

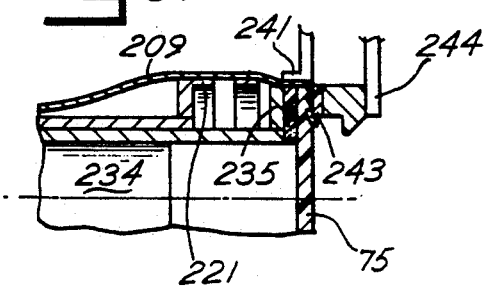
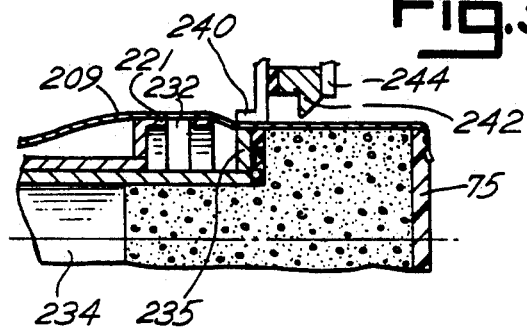
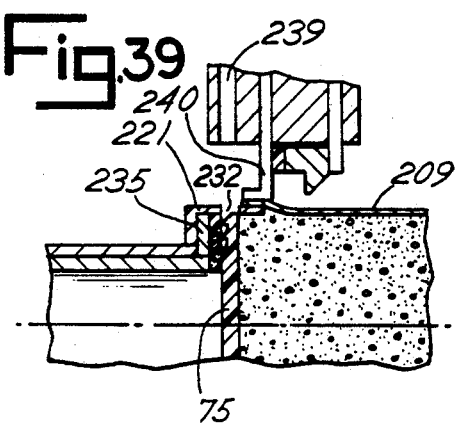
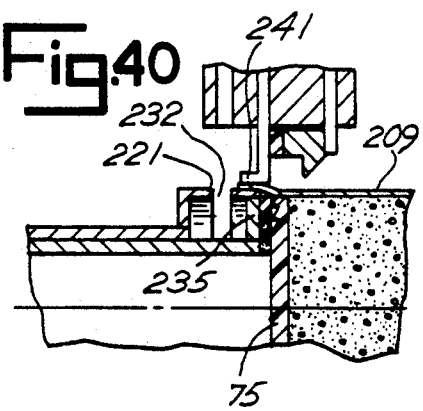
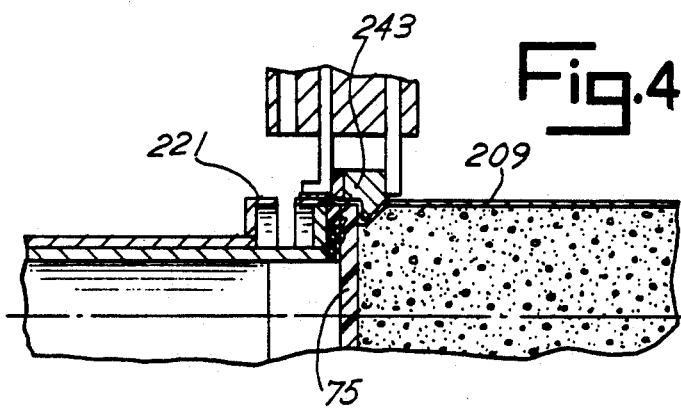

LARGE ENCASED MEAT PRODUCT WITH FLAT ENDS

RELATED APPLICATION

This is a continuation-in-part of U.S. patent application Ser. No. 07/982,027, filed Nov. 24, 1992 in the names of John H. Beckman, et al, which is a continuation of U.S. patent application Ser. No. 07/714,189 (now abandoned), filed Jun. 12, 1991 in the names of John H. Beckman, et al., the entire interest of which is owned by the assignee of the present application.

BACKGROUND OF THE INVENTION

The present invention relates to improved packages for forming and heat processing of food, particularly meat, and more specifically relates to dimensionally uniform processed meat products for high efficiency production and slicing.

In the manufacture of sausage products, meat emulsion is prepared from comminuted meat together with fillers, seasonings, spices, etc. A tubular food casing, such as one containing nonedible cellulose, is loaded onto a stuffing horn of a filling machine and stuffed with the meat emulsion. In the case of small sausage products, like frankfurters, the filled casings are twisted, tied or clipped into suitable links at predetermined intervals and further processed, For larger sausage products, like bologna, salami, and the like, the meat emulsion is introduced into larger heavier walled casings or casings having fibrous reinforcements, and formed into chubs or lengthy individual sausage sticks or logs. The manufacture of other types of processed meats is carried out using the same general method.

In preparing larger diameter processed meat products, like bologna, an important consideration is the maintenance of accurate size control over the entire length of the log. It is important that the diameter of larger products be controlled very carefully so that meat packers are able to cut the log into slices of predetermined thickness and diameter for repackaging. The objective is to have a given number of slices weigh a precise predetermined amount for each package. That is to say, a given number of slices should weigh as close as practical to one pound or some other preselected weight. In addition, precise diameter control alone is important for vacuumized packages where the product must support the package and where varying diameters would be objectionable.

A further important consideration in the preparation of larger diameter processed meat products for repackaging concerns end portions. Processed logs which have rounded ends provide poor yields. Some degree of taper is usually present with round ends and further decreases yield. The end portions of a bologna log, for example, which are normally rounded and which may also be tapered can result in the loss of several inches of meat from each end of the sausage. Significantly undersized sliced product is not usable in most vacuumized display packages and must be reworked at significant cost.

In an effort to maximize yields of sliced product for repackaging, methods have been developed for eliminating rounded and undersized ends. One popular approach to this problem has been to prepare cylindrically shaped sausage products having flat ends by utilizing a variety of methods and apparatus. While such attempts have attained some degree of success, none has proven to be entirely satisfactory.

For example, U.S. Pat. No. 3,777,331 discloses apparatus for preparing sausage products with flat ends in which the meat mass is placed in a loading chamber having an undersized flat end plate at each end. The meat mass is compressed and extruded from the chamber and through a stuffing horn with one end plate at each end of the meat mass. A continuous length of tubular casing is filled with successive charges of the meat mass and end plates by transporting the free end of the casing with a conveyor onto the end of the horn from which the charges of meat mass are extruded. The casing end is clamped onto the stuffing horn and the conveyor retracted to its starting position whereupon the meat mass and end plates are extruded into the casing. Because the end plates and meat mass pass through the inside of the stuffing horn while the casing is clamped on the outside of the horn, the casing has the potential for a relatively loose fit over the encased meat product and end plates. This is undesirable because of possible "fat-out" and jelly pocket formation from an accumulation of water with fat and/or gelatin. Such products have an unappetizing appearance, and consequently, have poor customer acceptance. The casing of U.S. Pat. No. 3,777,331 must be stretched substantially to prevent fat out, etc., which can result in tapering of each product end as it approaches the end plates which are no larger, and slightly less than the diameter of the unstretched casing.

U.S. Pat. No. 4,650,774 discloses a casing structure with flat ends attached to thick end plates wherein the casing is clamped against the broad peripheral surface of the end plates by rings with a tapered bore. The casing is filled through a hole in one of the end plates. U.S. Pat. No. 4,650,774 also does not recognize the importance of casing stretch on product quality, nor the affect of casing stretch upon end taper when the end plates have the same periphery as the casing prior to stretching.

Other representative examples of devices for preparing dimensionally uniform encased sausage products with flat ends are disclosed by U.S. Pat. Nos. 4,551,884 and 4,466,465, both of which employ elaborate end plate assemblies having central openings which are costly to fabricate. These end plates, called "flattening annular disks" require a central opening because they are mounted onto the end of the stuffing horn. The hole, however, makes it necessary to gather the casing over the face of the disk and apply a clip to close the opening and avoid loss of meat emulsion during filling. However, this is not enough to prevent substantial loss of emulsion pressed through the hole during stuffing which fills the space between the disk and the gathered and clipped casing. Consequently, it is necessary to use a thin tubular film connecting the disks.

Large producers make 80% of processed meat in casing for slicing and repackaging. Each plant may make thousands of logs daily from each automatic stuffing machine which typically has one operator. The operator loads the logs into processing racks as well as tends to the stuffing machine, and replenishes casing and clips. For the sole operator to apply clamps to each end of each log, as required by the system shown in U.S. Pat. No. 3,777,331, for example, would substantially increase labor cost.

In addition, the bulk of each clamp would cause problems when the logs are loaded onto the horizontal processing racks. The logs are placed lengthwise upon parallel spaced rods that support the full length of the log. Clamps on each end of a log would prevent the log ends from lying smoothly on the rods and cause the product to be misshapen after processing. In addition, clamps added to the thick flat end plates double the number of extraneous parts that must be handled by the processors.

Accordingly, it would be highly desirable to have an improved system of packaging for encased meat products, including those which are suitable for filling with whole muscle and chunk style products to produce dimensionally uniform products, and which have flat ends to maximize yields of sliced products for repackaging. This would especially include large size fibrous cellulose casing packages for forming and heat processing of meat and other food that provide dimensional uniformity for high efficiency production and slicing.

A U.S. patent application Ser. No. 07/714,189, filed Jun. 12, 1991, in the name of the present inventor as a coinventor, describes a casing with reinforcements on its terminal ends that can coact with end plates to resist the axial forces generated when the casing is stuffed with food product and processed under pressure. This application Ser. No. 07/714,189 is incorporated herein by reference.

SUMMARY OF THE INVENTION

It is therefore an object of the invention to provide a food package for processing meat comprising a tubular casing stretched tightly over a contained meat product with one or both ends of the tubular casing held at the peripheral zone of a rigid flat end unit of the same diameter as the stretched casing and with minimum casing length requirement for a given quantity of sliced meat.

It is a further object of the invention to eliminate rounded and tapered ends on processed meat for preslicing prior to repackaging for sale and thereby to reduce rework to a minimum.

It is a further object of the invention to provide an alternative to clips presently used to close the ends of casing before and after stuffing and to eliminate the cost of clips and clipping apparatus as well as their safety hazards and maintenance problems.

It is a further object of the invention to provide a food package with flat ends for forming and processing meat that can utilize a variety of casings including: cellulosic, fibrous reinforced cellulose and other plastic films such as polyamide, polyester, saran and others having suitable properties, such as copolymers and co-extrusions and coated films.

It is a further object of this invention to provide a food package that can effectively utilize shrinkable film as well as stretchable film.

It is yet a further object of this invention to provide end units that are capable of securely holding the end portions of the casing package, enlarged to the same diameter as the body of the package, without the need for external clamping devices to resist axial forces tending to separate them.

It is yet a further objective of this invention to provide for the holding of food product casing together with end plates without resorting to clamping around the edge of the end plates.

It is yet a further object of this invention to provide suitable methods of assembling a food package of the previous objectives.

It is yet a further object of the invention to utilize end plates of non-circular configuration as well as circular, so the product can be produced with non circular cross section if desired. This would include ovals to accommodate flattened ham squares and rectangles for externally restrained stuffing and D-shaped product.

It is yet a further object of the invention to provide an optional food product in which one end has a flat end plate without a clip and the other end being rounded and clipped.

It is another object of the invention to provide good handling characteristics to the logs and the end units, for product production in modern high production facilities.

It is a further object of this invention to provide a food package that can be produced on high speed automatic machines with minimum labor.

It is yet a further object of this invention to provide a food package that can be efficiently made from flat casing in long lengths and therefore does not require preshirred casing.

These and other objects of the invention are achieved in the tubular food casing embodiments disclosed herein which relate principally to large size food casings manufactured from materials like regenerated cellulose or regenerated cellulose supported by a fibrous web, such as hemp paper. Such casings are commonly referred to as large cellulose casings and fibrous casings, respectively. These casings are employed in the manufacture of large sausage and meat products, such as cooked salami and bologna, chunked and formed ham, chicken and turkey, cooked and smoked ham butts, and the like. They are also used for dried sausage which is not cooked and for other foods such as cheese.

While large cellulose casings and fibrous cellulose casings, including coated fibrous type casings, are most widely used and preferred, this invention is also intended to include other nonedible food grade type polymeric casings, such as those comprised of polyvinylidene chloride (PVDC), polyamide and polyester. In addition, this invention also contemplates co-extruded type casings prepared with more than one type of polymeric film. The casings prepared according to this invention may also be manufactured from films having commonly used internal and external treatments, coatings and impregnations, e.g. meat release agents, meat bonding agents, as well as plasticizer and humectants, various levels of moisture, including premoisturized, ready-to-f ill/no-soak type casings and those having additives, such as antimycotic agents and liquid smoke.

BRIEF DESCRIPTION OF THE DRAWINGS

FIG. 1 is a partial side view of a prior art orthodox large sausage package comprised of a tubular casing, contained meat and an end clip.

FIG. 2 is a partial side view of a prior art flat end large sausage product comprised of a tubular casing, contained meat, a flat end unit and an end clip.

FIG. 3 is a partial side view of an improved flat end large sausage product comprised of a tubular casing, contained meat and a flat end unit.

FIG. 4 is a partial cross sectional side view of an adhesive joint system of FIG. 3.

FIGS. 5-7 are partial cross sectional side views of alternative adhesive joint arrangements.

FIGS. 8a-b, 9a-b, 10a-b, 11a-b, 12a-b are partial cross sectional side views of various joint systems for clamping the terminal end of a casing to a flat end unit.

FIG. 16 is a side view of a flat end unit which holds the terminal end of the casing by means of piercing pins formed at the periphery of the flat end plate.

FIG. 17 is a front view of the flat end unit of FIG. 16.

FIG. 18 is a front end view of the flat end unit of FIG. 17 with its piercing pins bent radially inwardly.

FIG. 19 is a partial side cross-sectional view of a sizing disc for permitting ease of assembly of the casing to the flat end unit of FIG. 16.

FIG. 20 is a perspective view of a flat end unit bearing two circular rows of piercing pins.

FIG. 21 is a partial cross-sectional view showing a triangular piercing pin of a flat end unit.

FIG. 22 is a front view of a plurality of triangular pins of FIG. 21.

FIGS. 23–25 are partial cross sectional side views showing stages in the attachment of the casing to triangular pins of FIG. 21.

FIG. 26 is a side view of a casing having tension bands.

FIGS. 27 and 28 are partial side views of an improved product using the casing of FIG. 26.

FIG. 29 is an end view of the product of FIG. 28.

FIG. 30 is a schematic view of steps in a stuffing procedure.

FIG. 31 is a detailed top view of a portion of FIG. 30.

FIGS. 32–34 are detailed side views of portions of FIG. 30.

FIG. 35 is a side view cross section of the stuffing horn assembly.

FIGS. 36–43 are the schematic side views of apparatus and steps for assembling the encased food product with flat ends.

DETAILED DESCRIPTION OF THE PREFERRED EMBODIMENT

Figure 10A:
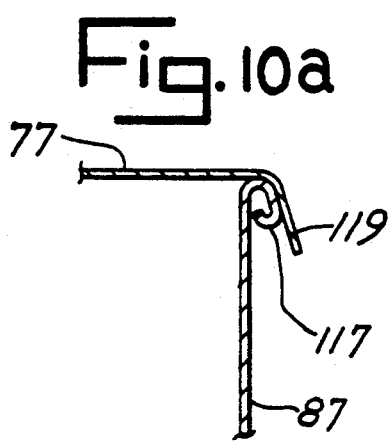

Referring to FIG. 1, a typical large sausage product 51 such as bologna, chunked and formed ham or other food products is generally tubular in form for permitting slicing and stacking for repackaging. Product 51 is closed at each end by gathering the outer casing 53 and clipping the open terminal end 55 closed by a clip 57. The manufacture of such a meat product 51 provides two rounded end portions 59, that contain meat. Such end portions 59 are not suitable for inclusion in modern sliced meat packages that require slices of uniform diameter. In addition, a few slices adjacent to the round ends are usually undersize due to the taper caused by the rounded ends.

The meat from rounded end portion 59 is normally ground and mixed with virgin meat emulsion or used in other meat products, often of lower grade. In either event, a significant cost is associated with reworking meat from the rounded ends. The amount of reworked meat is typically 1 to 1½ lbs. for a product used for packaged slices. The rework cost may be about 10¢ to 20¢ per lb.

Referring to FIG. 2, prior art methods of reducing this rework including the use of a flat disc 61 (are being shown) at each end of the product 63. Disc 61 is made of tin plated steel resembling the end units of cylindrical food cans. Disc 61 is inserted into a tubular casing 65 which had been previously clipped on one end by a clip 67. Disc 61 is manipulated into an orientation at right angles to the casing axis before the casing 65 is stuffed with meat emulsion. Orienting disc 61 is an awkward manual operation that is difficult to mechanize. An important factor in the problem is that the meat casing must be stretched 10% to 20% in diameter during stuffing and hence the disc 61 should be 10–20% larger in diameter than the casing 65. This insures full sized slices. Each disc 61 is held in place by the end portion 69 of the casing which is gathered to the center axis of the disc and clipped. Almost as much casing is used at the end of product 63 as with the rounded end meat product 51 (FIG. 1) so that the flat disc 61 has little compensating savings of production costs. The cost of the discs and additional labor subtracts substantially from the savings of rework costs.

Referring to FIG. 3, a flat end encased meat product 71 includes a casing holding system 73 formed at each end of the product. Holding System 73 (one end being shown) eliminates most of the cost of gathered casing and clips, and more than compensates for the cost of a flat end disc 75 which is used at each end of the product. Disc 75 is inserted into a tubular cylindrical casing 77 and the plane of disc 75 is orienting at right angles to the casing axis 79. Disc 75 is circular in shape and includes a flat inner surface 88. Disc 75 may be made from tin plated steel or other rigid materials, as for example, plastic. Disc 75 may also be oval shaped, rectangular, etc. depending on the cross-sectional shape of product 71.

Disc 75 is located near the end of the casing, generally indicated by reference numeral 81. Casing end 81 is stretched in diameter and drawn tightly over the circumferential edge of disc 75. The outer end edge 83 of casing 77 is unsupported and therefore remains or contracts to or near its original unstretched diameter. A terminal portion 85 of the casing end is located between end edge 83 and the circumferential edge of disc 75. Terminal portion 85 of the casing is bonded onto the outer surface 87 of the disc. The bonding of the terminal portion 85 to the outer surface of disc 75 holds the casing in a state of axial and radial tension when casing 77 is stuffed under pressure by an emulsion pump (not shown).

Referring to FIG. 4, flat end system 73 is shown in more detail and shows an adhesive layer 89 which holds the terminal portion 85 of casing 77 to the outer surface 87 of disc 75. The portion of the outer surface beneath terminal portion 85 is referred to herein as the peripheral boundary 84. Adhesive layer 89 may be formed from fast setting adhesives such as temperature resistant cyanoacrylate or heat sealing adhesives. The preferred adhesive is heat sealable saran which is described in U.S. Pat. No. 4,610,742. The saran adhesive has adequate strength at cooking temperatures and is resistant to hot water and animal fats. The saran adhesive is also FDA approved for direct contact with food.

The bonding surf aces of the end plates, disc 75, are preferably precoated with the adhesive. Heating of the adhesive may be carried out by contact with heated forms that fit the surfaces. Alternatively, the heating may be carried out by electronically heating the metal surface in the area of the bond or by electromagnetically heating the metal surf aces in the area of the bond or heating adhesives containing magnetically responsive particles.

It should be noted that precoating of the bonding surfaces on the end plates with adhesive is suitable only for disposable end plates. It would not be practical for typical meat processors to recoat the bonding surfaces with adhesives, as would be required for reusable end plates.

The food product which is pumped into the casing provides an axial force f1 against the inner surface 88 of disc 75 tending to force disc 75 outwardly away from casing 77. In addition, the food product provides a radial or peripheral force f2 against the casing tending to expanding the diameter or peripheral boundary of the casing. The holding of the terminal portion against the outer surface 87 of the disc by adhesive 89 serves to couple the axially outward force f1 of the food product with the axial tension f3 of the casing. Adhesive 89 prevents the terminal portion 85 of the casing from being pulled back over the peripheral edge of disc 75. Adhesive 89 is located within the peripheral boundary of the disc leaving the area outside of the peripheral boundary free from obstruction.

Referring to FIG. 5, a holding system 73' includes an adhesive layer 89 which secures casing 77 to disc 75. A metal cylindrical member 93 is integrally formed at the peripheral edge of disc 75. Metal members 93 extends outwardly and normal to disc 75 along its outer periphery as shown, and includes a casing confronting side surface 90. Adhesive layer 89 attaches the terminal portion 85 of casing 77 to the side surface 90 of metal member 93.

The holding system of FIG. 5, however, is limited to use for product that does not require high internal pressure and temperatures such as uncooked dry sausage. It is a known characteristic of adhesive bonds that they tend to fail when one substrate stretches under load and the other does not follow. Stretching under this condition concentrates the load at the edge of the bond and causes progressive failure. The holding systems of FIGS. 3, 4, and 6 are significantly less susceptible to stretch induced bond failure because of friction induced by the sharp downturn of the casing over the edge of the end plate disc. It has been found that rounding the edge reduces the effectiveness of the downturn.

Referring to FIG. 6, a holding system 73' includes an adhesive layer 89 which holds the terminal portion 85 of casing 77 to disc 75. Similar to FIG. 5, a metal cylindrical member 93 is integrally formed at the peripheral edge of disc 75. Casing terminal portion 85 is drawn over an outer edge surface 95 of metal member 93 and back inwardly along inside surface 97 of metal member 93, as shown. Adhesive layer 89 may be generally L-shaped being positioned against outer edge surface 95 and inside surface 97 for holding casing terminal portion 85 onto metal member 93. As will suggest itself, shapes of the adhesive other than L-shaped may be used, and adhesive layer 89 may be disposed only on surface 97.

Member 93 may be flared outwardly, at a small obtuse angle relative to the longitudinal axis of the product rather than being located normal to outer surface 87 of disc 75. This provides a nesting of adjacent discs prior to implantation, for shipment, storage or location in the stuffing machine magazine. With the holding system 73'' of FIG. 6, a snubbing action is caused by the terminal portion 85 of the casing being bent around metal member 93, which serves to reduce the stress on adhesive layer 89.

Referring to FIG. 7, a holding system 73''' includes a metal member 93' which is integrally formed at the outer periphery of disc 75. Metal member 93' is formed having a cross-sectional configuration, as shown, which presents an outwardly facing adhesive receiving surface 99 which is normal to the casing axis. Member 93' also provides an upwardly facing annular surface 101 for supporting casing 77. Adhesive 89 holds the terminal portion 85 of the casing onto receiving surface 99.

Referring to FIGS. 8a and 8b, a holding system is shown in which a metal member 103 is formed integral to the peripheral edge of disc 75. Metal member 103 includes a small cylindrical offset portion 105 which extends outwardly from and normal to the outer surface 87 of disc 75. Metal member 103 also includes an annular depending portion 107 which extends radially inwardly from the outer edge 109 of cylindrical portion 105. Depending portion 107 is spaced generally parallel to the outer surface 87 of the disc.

Casing 77 is stretched over disc 75 including the cylindrical offset portion 105 leaving a terminal portion ill of the casing. Terminal portion 111 is unsupported and therefore returns or attempts to return to its original diameter, as shown in FIG. 8a. As shown in FIG. 8b, the casing end portion 113 of the terminal portion ill is forced or tucked between the depending portion 107 and the outer surface 87 of disc 75. After the casing end portion 113 is tucked into place, the metal member 103 is forced toward the outer surface of disc 75 clamping the end casing portion 113 against the outer surface 87 of the disc. The clamping action serves to hold the casing relative to the disc.

As shown in FIGS. 9a and 9b, another embodiment is illustrated similar to the embodiment of FIGS. 8a, 8b wherein the end edge 115 of the metal member 103 is curled to provide a smooth curve surface for contact against the casing during clamping. This avoids a sharp clamping edge and improves the holding ability of the metal member 103.

Figure 10B:
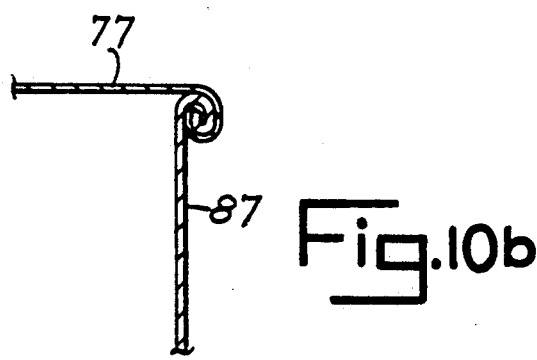

As shown in FIG. 10, another embodiment is illustrated similar to the embodiment of FIGS. 8 and 9. A metal member 117 is formed integral to the peripheral edge of disc 75. Metal member 117 has a curled cross sectional configuration as shown and is continuous around the full extent of the peripheral edge of disc 75. The end 119 of the terminal portion of the casing is tucked behind the curl-shaped metal member 117 as shown in FIG. 10b. Thereafter, the curl-shaped metal member 117 is flattened for clamping the terminal end 119 of the casing against the outer surface 87 of the disc 75.

Figure 11A:
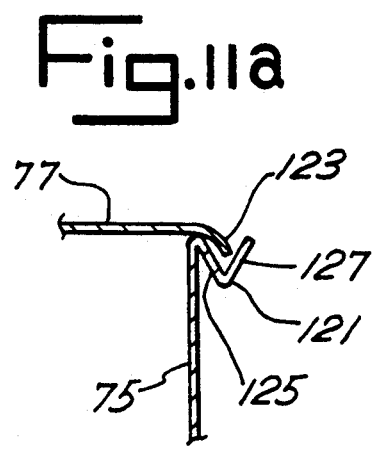
Figure 11B:
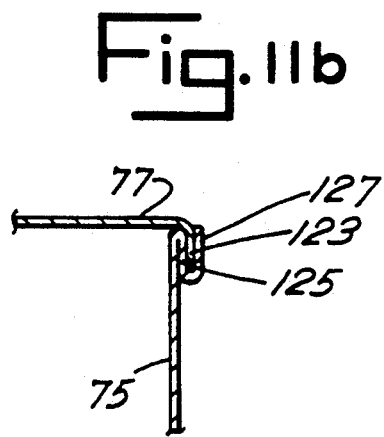

As shown in FIG. 11, a metal member 121 is formed integral to the peripheral edge of disc 75. Metal member 121 includes two arms 125, 127 which are disposed in a generally V-shaped cross sectional configuration, as shown, and are continuous in length around the full extent of the peripheral edge of disc 75. The end 123 of the terminal portion of the casing 77 is pulled over disc 75 and then inserted into the open V-shaped mouth of the metal member 121 between arms 125, 127, as shown in FIG. 11a. Thereafter, metal member 121 is flattened so as to close the opening of the V-shaped mouth, as shown in FIG. 11b, to extent that the two arms 125, 127 of the V-shaped configuration are clamped together grasping the terminal end 123 of the casing therebetween. This serves to grip the casing preventing its removal from disc 75.

Figure 12A:
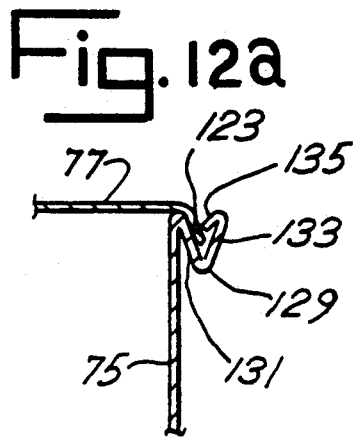
Figure 12B:
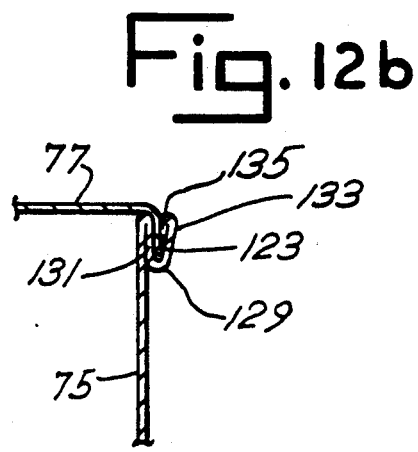

Referring to FIG. 12, a metal member 129 is secured to the peripheral edge of disc 75. Metal member 129 includes three separate leg portions, 131, 133, and 135. Legs 131, 133 are connected in a V-shape configuration similar to that shown in FIG. 11. Leg 135 extends from the terminal end of leg 133 inwardly toward the open area of the V mouth formed by legs 131, 133. The terminal end 123 of casing 77 is pulled over disc 75 and inserted into the V mouth formed by legs 131, 133. The terminal end 123 of the casing is inserted within the V mouth to a position radially inward of the terminal end of leg 135. After the casing end 137 is in position, the metal member 129 is flattened together serving to hold the terminal portion of the casing 77 relative to disc 75.

Figure 13A:
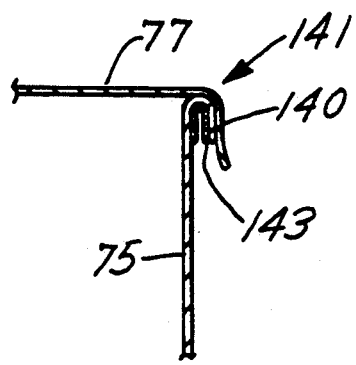
FIGS. 13a–b, 14a–b, 15a–b are partial cross sectional side views of various joint systems that combine adhesive bonding with clamping of the terminal end of a casing to a flat end unit.
Figure 13B:
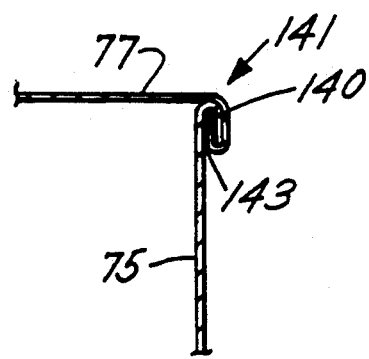

Referring to FIG. 13, a metal member 141 similar to that shown in FIG. 8a is secured to the outer peripheral edge of disc 75. The casing 77 is pulled over disc 75 leaving a terminal end 140, as shown in FIG. 13a. An adhesive layer 143 is positioned between metal member 141 and the outer surface of disc 75. As shown in FIG. 13a, adhesive layer 143 is located on the outer surface of disc 75 as well as on metal member 141. As shown in FIG. 13b, the terminal end 111 of casing 77 is tucked between the layers of adhesive and thereafter metal member 111 is flattened in order to clamp the casing end relative to disc 75. This combination of both clamping and adhesion tends to supplement one another. Whereas a clamping structure may tend to slip in some instances, the adhesion layer may require longer cure time prior to moving of the product. In addition, adhesion may fail progressive due to the stretchability of the casing. Clamping can lend its force where needed to reduce stretchability affects.

Figure 14A:
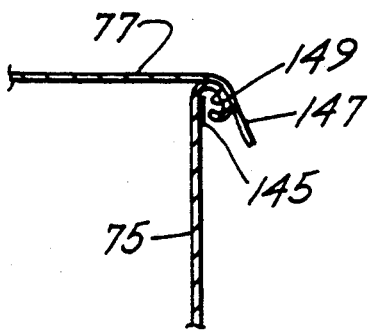
Figure 14B:
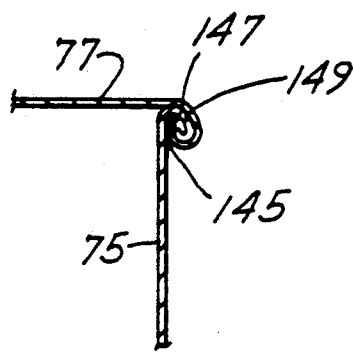
Figure 15A:
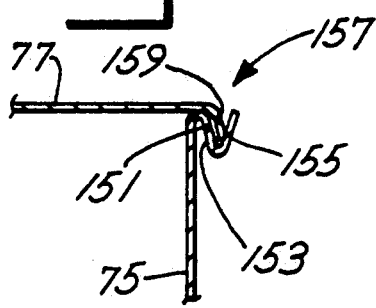

Likewise, an adhesive layer may be provided with respect to the clamping structures of FIGS. 9, 10, 11 and 12. More particularly, FIGS. 14 and 15 illustrate the use of adhesive layers. As shown in FIG. 14, an adhesive layer 145 is located at the outer peripheral edge of disc 75. The terminal end 147 of the casing is tucked between the metal member 149 and the adhesive layer 145 prior to flattening of metal member 149.

Figure 15B:
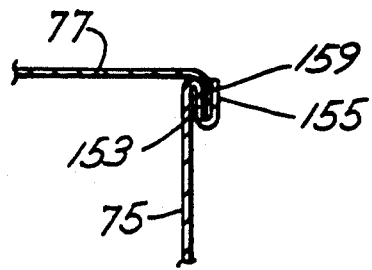

As shown in FIG. 15, an adhesive layer 151 is located on both legs 153, 155 of a V-shaped cross-sectional configuration of a metal member 157. After the casing end 159 is positioned within the V mouth of metal member 157, legs 153, 155 are flattened together as shown in FIG. 15b.

Referring to FIGS. 16 and 17, a flat end disc 161 includes a plurality of piercing members or pins 163 which are disposed for facing outwardly from the disc 161. The piercing members are equally spaced around the outer most radial circumference of disc 161 as shown in FIG. 17. Casing 77 is stretched over the edge of disc 161 to an extent so as to provide a terminal portion 167 of casing 77. Portion 167 is pierced by piercing pins 163 and retracts to its original diameter 166 as shown in FIG. 17.

As shown in FIG. 18, piercing pins 163 may be bent radially inward for operator safety. Further, they may be bent flat against the terminal portion of the casing for assisting in a mechanical holding of casing 77 relative to disc 161.

Referring to FIG. 19, a sizing member 171 may be used to avoid premature engagement of piercing pins 163 with the terminal portion of the casing. Disc 161 is positioned within a holding aperture 173 of the sizing member 171. An extending lip 175 extends axially outward to a position further extended than piercing pins 163. The casing 77 is pulled over sizing member 171 and the terminal portion of the casing is stretched over lip 175 and permitted to extend radially inwardly to its original diameter. The terminal portion of the casing will be spaced adjacent to points 163 but will not be in contact with the pins.

An ejection member 177 is pushed in order to move disc 161 out of its holding aperture 173 for causing points 163 to pierce the terminal portion of the casing. A magnet 179 may be used to hold disc 161 within its receiving aperture 173 until ejection member 177 is actuated. When stuffing begins, meat pressure against disc 161 will push the disc forward, separating it from sizing disc 171. The casing will move over sizing disc 171 until stuffing is complete.

The use of piercing pin members which are ⅛ inch in length and spaced apart by ¼ inch were found to hold an equivalent of 4 PSI internal casing pressure when the casing was moist but unheated. In order to increase the holding capability without the decreasing the piercing capability, smaller, shorter pins may be incorporated between larger pins. Such a system provides a two stage piercing action for ease of piercing. It was found that this raised the holding capability to the equivalent of 6–9 PSI without bending the pins. The easy piercing with alternative pin lengths permits reduced sharpness, so bending was not necessary for safety. This permits reuse of the end plates upon washing and provides substantial operating cost reductions.

Referring to FIG. 20, a second row of piercing pins 181 may be positioned on the outer surface of disc 161. The second circular row of pins 181 is located at a radial circumference smaller than the first row of piercing pins 163. In addition,, the outer row of pins is located radially inward from the periphery of disc 161. This has the effect of gaining some snubbing effect that adds to the holding ability of these and other types of pins. The pins 181 of the second row are staggered relative to the pins 163 in the first row. It has been found that the second row of pins increases the holding capacity to 6 or 7 PSI. Pins shown are round, but could be of other shapes without departing from the two row concept. FIG. 21 shows piercing pins shaped as truncated triangles.

As shown in FIG. 21, disc 75 includes a single row of truncated triangular pins 183 although two rows may be used and are preferred. A frontal view of triangular pins 183 is illustrated in FIG. 22. As shown in FIGS. 23 and 24, casing 77 is stretched over the edge of disc 75. The terminal portion 185 of casing 77 is permitted to retract to its original diameter. The terminal portion is pressed against triangular pins 183 which pierce the casing so as to hold the casing relative to disc 75. It has been found that the triangular profile cuts out a 4-sided hole having a slit along three sides with the fourth side remaining uncut and attached to the casing. Thus,, no debris occurs.

As shown in FIG. 25, a backup ring 187 and a casing bump ring 189, comprised of a rigid metal ring 191 and an elastomer contact ring 193, may be utilized to carry out the piercing action of pins 183 through the terminal portion 185 of casing 77. It has been found that a substantial impact force is required to achieve consistent piercing.

The term "flat", describing an end plate is used broadly. True-flatness can ideally, eliminate reworking of the first slice. This is desirable but is not a necessity.

The flat end plates of FIGS. 20–25 are preferably reusable upon washing and are preferably made of durable plastic. A preferred plastic for the product to be cooked while under the pressure of fibrous casing at maximum diameter is polysulfone or its related plastics. It has adequate bending strength at 200° F., is resistant to hydrolysis, is resistant to animal fats, is resistant to alkaline washing solutions, is resistant to crazing, and has reasonable impact value and wear resistance. It is readily moldable and cost affordable. Other plastics with comparable properties should be acceptable.

Stainless steel end plates made as per FIGS. 16-19 would be a second choice for reusable service.

Tin plated steel would be preferred for disposable service as in FIGS. 3-15. Tin plated steel end plates could also be made with piercing pins as in FIGS. 16-19.

Referring to FIG. 26, a casing 201 includes tension bands 203 which are preapplied to the end zones 205 of the casing. The particulars of this casing structure are set forth in the U.S. Pat. application Ser. No. 07/714,189, filed Jun. 12, 1991, referred to above.

Referring to FIG. 27, a disc 207 is positioned in the end zone of casing 201 which serves to expand the casing enlarging its diameter. Terminal portion 209 of the casing is held against the outer side of disc 207 against the axial tension of the casing caused by the food product forced against the inner side of disc 207. Tension band 203 prevents the terminal end 211 of the casing from stretching to the diameter of disc 207 caused by the force of the food product against the inner surface of disc 207. As shown in FIGS. 28, 29, during the application of heat, tension band 203 will flatten against the backside of disc 207 due to the yielding of the band edge nearest to the disc because that edge initially carries the concentrated load of the meat pressure force on the disc. As that band edge stretches and moves toward the periphery, it pulls the rest of the band after it and the entire band width becomes flat against the flat end plate if the band strength and width are appropriate.

Various apparatus and methods may be used to make the food product with the particular holding systems described above. For example, U.S. patent application, Ser. No. 07/714,189, referred to above discloses apparatus and a sequence of steps which may be performed in preparing dimensionally uniform stuffed meat products with flat ends, using the holding system of the present FIGS. 26-29.

Referring to FIG. 30, a length of flat casing 209 is pulled and severed from a continuous casing supply reel 211. As schematically represented in FIG. 30, casing 209 travels vertically upward from reel 211 to a pair of driving rollers 213. Rollers 213 feed the casing horizontally with the casing being supported by a conveying belt 232. A moveable cutter 215 is positioned above casing 209 and is operable for cutting the casing into individual lengths for subsequent stuffing. Conveying belt 232 continues the horizontal movement of the casing length to a turning roll 217 which feeds the casing vertically downward to a casing opener 219 upon which cutter 215 is activated. A clear plastic enclosure (not shown) may be to enclose the conveying apparatus in order to reduce moisture loss to ambient air that would reduce casing stretchability.

Referring to FIG. 31, casing opener 219 utilizes vacuum on the outside surface of casing 209 to spread the flat casing apart so as to open the casing for movement onto a sizing disc 221, somewhat similar to sizing disc 171 of FIG. 19.

Referring to FIGS. 32 and 33, a casing puller 223 receives the edge of the casing located on the forward plane of sizing disc 221 and pulls the forward casing edge downward and then beneath the lowest edge of sizing disc 221. The casing puller continues its movement of the casing along the outer sleeve 225 of the stuffing horn assembly 226, as indicated by the dotted line in FIG. 30. Casing puller 223 may grip the casing edge in a number of ways including the use of a mechanical gripping member 222.

Referring to FIGS. 34 and 36, two high friction elastomeric shirring rolls 227 engage the casing after it has been moved into position and released by puller 223. Rolls 227 move the casing in an aft direction along the outer sleeve 225 of the stuffing horn assembly. The aft end of the casing is drawn through shirring rolls 227 and onto sleeve 225 to form multiple low density soft casing pleats. Although the casing on the upper side of sleeve 225 is severely bunched together as shirring begins, the bunching disappears and the casing becomes centered on the sizing disc. The casing is pulled over the sizing disc until a terminal end portion 229 remains (FIG. 36). Thereupon, the shirring rolls are disengaged from the casing.

Referring to FIG. 35, sizing disc 221 has a slot 232 in the upper half of its rim for insertion of end plate 75. Plate 75 is made of ¼ inch thick polysulphone plastic and has two concentric rows of triangular pins for holding the casing. End plate 75 is automatically removed from a feed magazine (not shown) and is placed through slot 232 to rest inside the outer edge 228 of sizing disc 221. This end plate 75 is known as the first end plate.

Sizing disc 221 is fixedly attached to outer sleeve 225 which is axially moveable relative to a stuffing horn 234. An annular ring push plate 235 is nested within the sizing disc and is attached to an inner cylindrical sleeve 233 which is also axially moveable relative to stuffing horn 234 and relative to sleeve 225. Push plate 235 is moveable for forcing end plate 75 into piercing engagement with the terminal end portion 229 of the casing.

Push plate 235 is faced with a flat ring 236 of 80A Durometer polyurethane and a smaller diameter flat ring 237 of closed cell polyethylene foam. Stuffing horn 234 supports both sleeves 233, 225 and is held stationary.

After first end plate 75 is moved into place within sizing disc 221, the casing delivery system of FIGS. 30 34 moves a length of casing into place as shown in FIG. 36. A stuffing head 238 is positioned several inches adjacent and forward of sizing disc 221, and provides clearance for the casing delivery system of FIGS. 30-33. After casing placement onto the horn assembly, stuffing head 238 interacts with the casing and with end plate 75 so as to secure the casing to the end plate via the two rows of triangular pins.

Stuffing head 238 is roughly rectangular in outer dimensions and supported on two shafts (not shown) that move axially parallel to the axis of stuffing horn 2 3 4. The center area of stuffing head 238 is open to provide a clear path for the stuffed product as needed. A slot 239 provides a guide for end plates as they are transferred from the magazine to slot 232 in sizing disc 221.

Stuffing head 238 includes twelve brake fingers 240. Fingers 240 are equally spaced in a circular alloy and serve to hold the casing onto the sizing disc during stuffing. Each brake finger 240 is radially moveable and carries a braking surface 241 for engagement against the casing as described hereinafter.

Stuffing head 238 includes a plurality of bump fingers 244. Fingers 244 are moveable radially inwardly. Each finger 244 carries an elastomer ring segment 242 having a 80A Durometer polyurethane pad 243. Bump fingers 244 are used to press the aft terminal end portion 229 of the casing against the triangular pins on the first end plate for attaching the casing to the end plate.

Referring to FIG. 37, push plate 235 is moved forward approximately 5/8 inch and sizing disc 221 moves forward approximately ¼ inch. Bump fingers 244 move radially inward and stuffing head 238 is moved rapidly to impact polyurethane pads 243 against casing end 229 and impale the terminal end zone of the casing onto the pins of flat end unit 75.

Referring to FIG. 38, bump finger assemblies 242–244 move radially outward. Brake fingers 241 move radially inward pressing with a controlled force against casing 209. The meat pump begins pumping meat emulsion through the stuffing horn 234 and into the casing. The first end plate 75 is pushed forward by the force of the meat emulsion. The casing is pulled over the sizing disc and under the brake fingers, as shown in FIG. 38.

Referring to FIG. 39, the meat emulsion pump is stopped by a sensor (not shown) located in the path of the extending product being stuffed. Push plate 235 and sizing disc 221 are returned to the original position of FIG. 36. The terminal end of the casing 209 has been stopped and held securely by the brake fingers 241.

End plate 75 has passed through guide 239 and into slot 232 of the sizing disc. Recognizing that such precise stopping is difficult, it is observed that the flat-end plate 75 will push excess casing into the slot, being assisted by the natural tendency of stretched casing to return to its original size.

In FIG. 40, push plate 235 moves the second end plate 75 forward beyond the edge of the sizing disc 221 while brake fingers 241 continue to firmly hold the end of casing 209. As the second end plate moves forward while the meat emulsion pump is idle a void 245 is formed that assists in the separation of end plate 75 from the meat emulsion.

Referring to FIG. 41, bumper fingers 244 move radially inward, depressing the encased product forward of the peripheral zone of second end plate 75 and gripping its edge and the casing 209 with ring segment 242.

Figure 42:
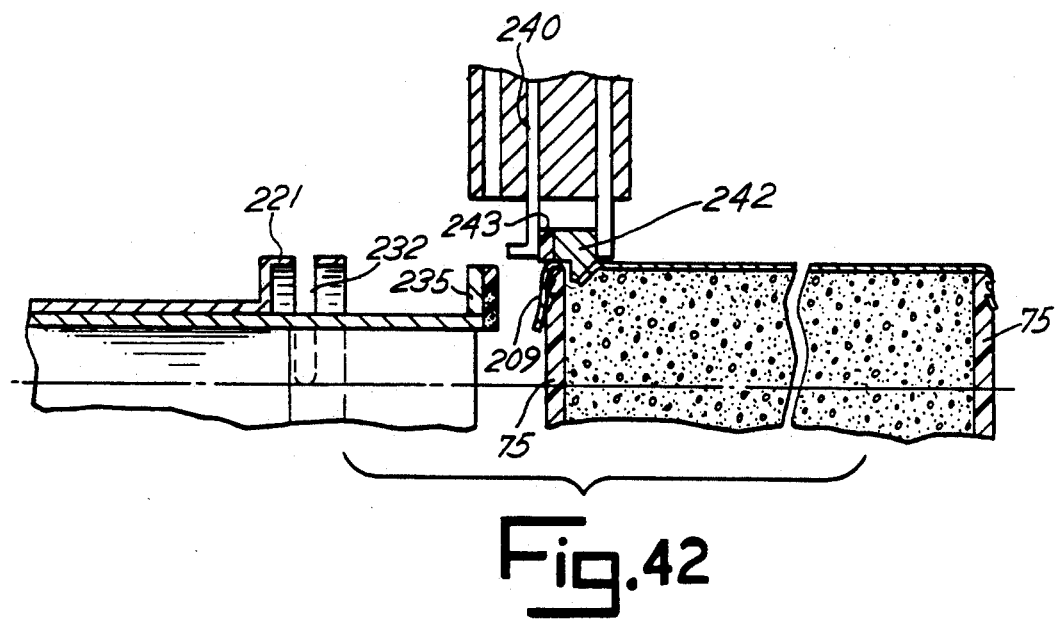

As shown in FIG. 42, brake finger 240 move radially outward, releasing terminal end of casing 209 from sizing disc 221 when stuffing head 238 moves forward. When released from the sizing disc, the terminal end of the casing returns toward its original size and is in position to be impaled upon the pins of second end unit 75 when impacted by advancing push plate 235.

Figure 43:
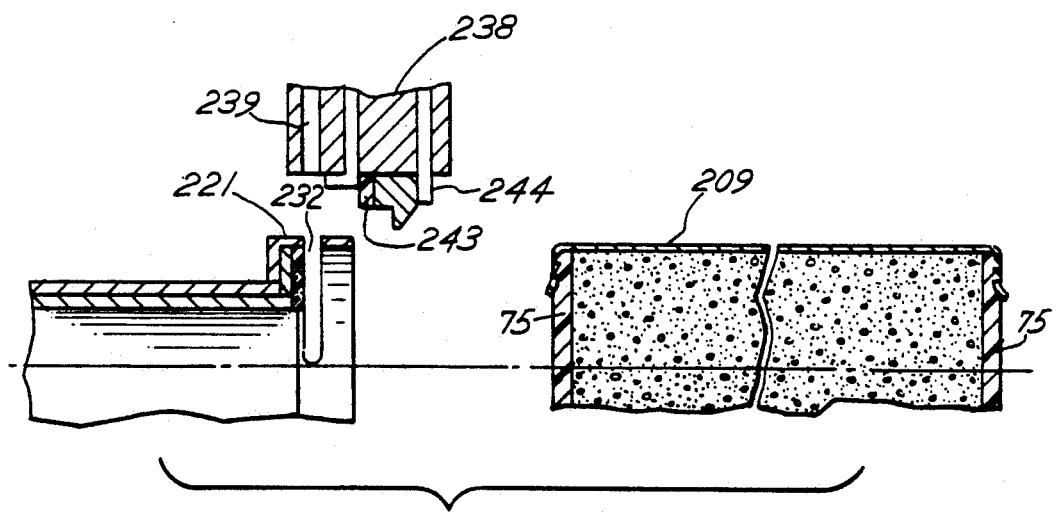

As shown in FIG. 43, the bumper fingers 243 have moved radially outward to release second end plate 75 and stuffing head 238 has moved aft to align the end plate guide 239 with slot 232 in sizing disc 221. This completes the cycle and the next cycle begins with the insertion of first end plate 75 in FIG. 35.

A useful encased food product with only a first flat end and the second end gathered to a round end and clipped is a contemplated embodiment. It would have the advantage of simplifying the stuffing machine although operating savings would be less.

Because the single unit end closures are made of lightweight tough plastic and only ⅛ inch thick, the end units may be placed into compact magazines by the person peeling the casing off the product for slicing. Each pair of end plates are placed into the magazine directly after removal from the product. They remain in the collecting magazine through ultrasonic washing, through storage, transport and placement into the stuffing machine for reuse.

While several preferred embodiments of the invention has been described hereinabove, those of ordinary skill in the art will recognize that the embodiments may be modified and altered without departing from the central spirit and scope of the invention. Thus, the preferred embodiments described hereinabove are to be considered in all respects as illustrative and not restrictive, the scope of the invention being indicated by the appended claims, rather than by the foregoing description, and all changes which come within the meaning and range of equivalency of the claims are intended to be embraced herein.

What is claimed is:

1. An elongated encased food product having flat ends, comprising:
   a length of tubular elongated casing,
   a food product contained within said casing; and
   a flat end plate,
   wherein said tubular casing being in axially stretched condition caused by its containment of said food product and containment of said flat end plate, said flat end plate being located near a terminal end of said casing and being oriented normal thereto; a terminal portion of said casing extending axially beyond the outer surface of said end plate, said terminal portion of said casing terminating in a periphery smaller than the periphery of said end plate; and
   holding means for holding said terminal portion of said casing to the peripheral area of the outer surface of said end plate for coupling the axially outward force of the contained food product pressing against the inner surface of said end plate, with the axial tension of the casing.

2. An elongated encased food product according to claim 1, wherein said holding means includes a plurality of pins projecting from said outer surface of said flat end plate for piercing and holding said terminal portion of said casing.

3. An elongated encased food product according to claim 2 wherein said plurality of pins are equally spaced at a uniform distance from the periphery of said end plate.

4. An elongated encased food product according to claim 2 wherein said plurality of pins are manipulable after piercing.

5. An elongated encased food product according to claim 4 wherein said pins are bendable for clamping said terminal portion of said casing against said flat end plate.

6. An elongated encased food product according to claim 2 wherein said holding means includes two rows of pins, each row being a uniform distance from the periphery of the flat end plate.

7. An elongated encased food product according to claim 6 wherein the pins of the second circular row being located on a different radial lines from the radial lines of the pins of the other row of said end plate.

8. An elongated encased food product according to claim 1, wherein said holding means includes an adhesive for bonding said terminal portion to the exterior surface of said flat end plate.

9. An elongated encased food product according to claim 1, wherein said holding means includes a deformable metal member which is deformed for holding said terminal portion of said casing by clamping force.

10. An elongated encased food product according to claim 9, wherein said terminal portion of said casing is held by frictional force provided by said metal member.

11. Elongated encased food product according to claim 10 wherein said metal member is flattened against said outer surface of said flat end plate clamping said terminal portion of said casing therebetween.

12. An elongated encased food product according to claim 9 and further including an adhesive for assisting holding by said metal member.

13. An elongated encased food product according to claim 11 and further including an adhesive for assisting holding by said metal member.

14. An elongated encased food product according to claim 1, and including a second rigid flat circular end plate located at the terminal end opposite said first recited terminal end of said casing.

15. An elongated processed food product according to claim 1, wherein said tubular casing is fibrous reinforced regenerated cellulose.

16. An elongated encased food product according to claim 1, wherein said tubular casing is fibrous reinforced regenerated cellulose.

17. An elongated encased food product according to claim 1, wherein said tubular casing is plastic.

18. An elongated encased food product according to claim 17, wherein said plastic is heat shrinkable.

19. An elongated encased food product comprising a tubular casing in a state of biaxial tension and having two end zones, at least one of said end zones being in a state of axial and radial tension; a food product contained within said casing; a flat end unit disposed within said casing in the area of the one end zone; and holding means for holding said one end zone to said end plate for coupling the axial outward force of the contained food product pressing against the interior surface of said end unit, with the axial tension of said casing, said holding means operating in the peripheral boundary of said end unit for preventing said one end zone from being stretched over said peripheral edge of said end unit by action of said outward force.

20. An elongated encased food product according to claim 19, wherein said holding means includes an adhesive bonding said one end zone to the exterior surface of said one end unit.

21. An elongated encased food product comprising a tubular casing in a state of biaxial tension and having two end zones, at least one of said end zones being in a state of axially and radial tension;
a food product contained within said casing;
an end unit disposed within said casing in the area of the one end zone and providing a flat inner surface for contacting said food product, said end unit including a casing confronting side surface; and
preapplied hot melt adhesive means located on said casing confronting side surface for holding said one end zone to said end plate for coupling the axial outward force of the contained food product pressing against the inner surface of said end unit, with the axially tension of said casing, said adhesive preventing said one end zone from being stretched away from said casing confronting side surface of said end unit by action of said outward force.

22. An elongated encased food product according to claim 20 wherein said casing confronting side surface is a continuous surface having cross sectional configuration being substantially identical to the cross sectional configuration of the food product.

23. An elongated encased food product according the claim 20 wherein said casing confronting side surface is cylindrical in shape.

* * * * *

UNITED STATES PATENT AND TRADEMARK OFFICE
CERTIFICATE OF CORRECTION

PATENT NO. : 5,277,648
DATED : January 11, 1994
INVENTOR(S) : Beckman, et al.

It is certified that error appears in the above-indentified patent and that said Letters Patent is hereby corrected as shown below:

On title page, item [75], Inventors:
"LaGrange" should read --Indian Head Park.--

Signed and Sealed this

Twentieth Day of December, 1994

Attest:

BRUCE LEHMAN

Attesting Officer   Commissioner of Patents and Trademarks